(12) United States Patent
O'Donnell et al.

(10) Patent No.: US 10,065,147 B2
(45) Date of Patent: Sep. 4, 2018

(54) GAS PURIFICATION USING SOLAR ENERGY, AND ASSOCIATED SYSTEMS AND METHODS

(71) Applicant: GlassPoint Solar, Inc., Fremont, CA (US)

(72) Inventors: John Setel O'Donnell, Palo Alto, CA (US); Peter Emery von Behrens, San Francisco, CA (US); Philip Gregory Brodrick, Cincinnati, OH (US)

(73) Assignee: GlassPoint Solar, Inc., Fremont, CA (US)

( * ) Notice: Subject to any disclaimer, the term of this patent is extended or adjusted under 35 U.S.C. 154(b) by 186 days.

(21) Appl. No.: 14/918,489

(22) Filed: Oct. 20, 2015

(65) Prior Publication Data
US 2016/0114284 A1 Apr. 28, 2016

Related U.S. Application Data

(60) Provisional application No. 62/067,826, filed on Oct. 23, 2014.

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1456* (2013.01); *F22B 1/006* (2013.01);
(Continued)

(58) Field of Classification Search
CPC ............ B01D 53/1412; B01D 53/1425; B01D 53/1456; B01D 53/1468; B01D 53/1475;
(Continued)

(56) References Cited

U.S. PATENT DOCUMENTS 1,240,890 A  9/1917  Shuman et al.
2,217,593 A  10/1940  London
(Continued)

FOREIGN PATENT DOCUMENTS

CN  2050918 U  1/1990
CN  2926930 Y  7/2007
(Continued)

OTHER PUBLICATIONS

International Search Report and Written Opinion in International Application No. PCT/US2015/056530, dated Jan. 28, 2016, 12 pages.
(Continued)

*Primary Examiner* — Cabrena Holecek
(74) *Attorney, Agent, or Firm* — Perkins Coie LLP

(57) ABSTRACT

Techniques for purifying gases, and associated systems and methods are disclosed. A representative system includes an absorption vessel that can separate impurities from an input gas, a regeneration vessel that can release the impurities from the solvent, a rich solvent storage vessel, and a lean solvent storage vessel. The system can include a solar concentrator array and a thermal storage unit for storing the thermal energy generated by the solar concentrator array.

15 Claims, 9 Drawing Sheets

(51) Int. Cl.

| | |
|---|---|
| *F24J 2/34* | (2006.01) |
| *F24J 2/42* | (2006.01) |
| *F22B 1/00* | (2006.01) |
| *F28D 20/00* | (2006.01) |
| *F28D 20/02* | (2006.01) |
| *F23J 15/00* | (2006.01) |

(52) U.S. Cl.
CPC ............ *F23J 15/006* (2013.01); *F24J 2/34* (2013.01); *F24J 2/42* (2013.01); *F28D 20/0056* (2013.01); *F28D 20/02* (2013.01); *B01D 53/1412* (2013.01); *B01D 53/1468* (2013.01); *B01D 53/1475* (2013.01); *B01D 53/18* (2013.01); *B01D 2258/0283* (2013.01); *B01D 2259/655* (2013.01); *Y02E 10/40* (2013.01); *Y02E 60/142* (2013.01); *Y02E 60/145* (2013.01); *Y02E 70/30* (2013.01)

(58) Field of Classification Search
CPC .... B01D 53/18; F22B 1/006; F24J 2/34; F24J 2/42; F28D 20/0056; F28D 20/02; Y02E 10/40; Y02E 60/142; Y02E 60/145; Y02E 70/30
See application file for complete search history.

(56) References Cited

U.S. PATENT DOCUMENTS

| | | |
|---|---|---|
| 2,221,919 A | 11/1940 | Kenan |
| 2,859,745 A | 11/1958 | von Brudersdorff |
| 3,672,572 A | 6/1972 | Delfs |
| 3,847,136 A | 11/1974 | Salvail |
| 3,923,039 A | 12/1975 | Falbel |
| 3,962,873 A | 6/1976 | Davis |
| 3,991,740 A | 11/1976 | Rabl |
| 3,994,279 A | 11/1976 | Barak |
| 3,996,917 A | 12/1976 | Trihey |
| 4,003,366 A | 1/1977 | Lightfoot |
| 4,015,585 A | 4/1977 | Fattor |
| 4,078,549 A | 3/1978 | McKeen et al. |
| 4,083,155 A | 4/1978 | Lampert |
| 4,088,116 A | 5/1978 | Pastor |
| 4,095,369 A | 6/1978 | Posnansky et al. |
| 4,108,154 A | 8/1978 | Nelson |
| 4,122,832 A | 10/1978 | Hirschsohn et al. |
| 4,124,277 A | 11/1978 | Stang |
| 4,149,523 A | 4/1979 | Boy-Marcotte et al. |
| 4,159,712 A | 7/1979 | Legg |
| 4,174,752 A | 11/1979 | Slater et al. |
| 4,184,482 A | 1/1980 | Cohen |
| 4,202,322 A | 5/1980 | Delgado et al. |
| 4,209,222 A | 6/1980 | Posnansky |
| 4,219,008 A | 8/1980 | Schultz |
| RE30,407 E | 9/1980 | Lightfoot |
| 4,230,095 A | 10/1980 | Winston |
| 4,237,864 A | 12/1980 | Kravitz |
| 4,249,340 A | 2/1981 | Maes, Jr. |
| 4,258,696 A | 3/1981 | Gopal |
| 4,263,893 A | 4/1981 | Pavlak et al. |
| 4,280,480 A | 7/1981 | Raposo |
| 4,282,394 A | 8/1981 | Lackey et al. |
| 4,287,880 A | 9/1981 | Geppert |
| 4,290,419 A | 9/1981 | Rabedeaux |
| 4,314,604 A | 2/1982 | Koller |
| 4,318,394 A | 3/1982 | Alexander |
| 4,333,447 A | 6/1982 | Lemrow et al. |
| 4,343,533 A | 8/1982 | Currin et al. |
| 4,371,623 A | 2/1983 | Taylor |
| 4,372,386 A | 2/1983 | Rhoades et al. |
| 4,386,600 A | 6/1983 | Eggert, Jr. |
| 4,410,156 A | 10/1983 | Pischzik et al. |
| 4,423,719 A | 1/1984 | Hutchison |
| 4,445,499 A | 5/1984 | Platell |
| 4,462,390 A | 7/1984 | Holdridge et al. |
| 4,484,568 A | 11/1984 | Witt |
| 4,490,926 A | 1/1985 | Stokes |
| 4,597,377 A | 7/1986 | Melamed |
| 4,628,142 A | 12/1986 | Hashizume |
| 4,727,854 A | 3/1988 | Johnson |
| 4,741,161 A | 5/1988 | Belart et al. |
| 5,048,507 A | 9/1991 | Ridett |
| 5,103,524 A | 4/1992 | Vowles |
| 5,191,876 A | 3/1993 | Atchley |
| 5,258,101 A | 11/1993 | Breu |
| 5,344,496 A | 9/1994 | Stern et al. |
| 5,347,402 A | 9/1994 | Arbogast |
| 5,520,747 A | 5/1996 | Marks |
| 5,524,610 A | 6/1996 | Clark |
| 5,699,785 A | 12/1997 | Sparkman |
| 5,851,309 A | 12/1998 | Kousa |
| 5,954,046 A | 9/1999 | Wegler |
| 6,017,002 A | 1/2000 | Burke et al. |
| 6,129,844 A | 10/2000 | Dobelmann |
| 6,220,339 B1 | 4/2001 | Krecke |
| 6,233,914 B1 | 5/2001 | Fisher |
| 6,294,723 B2 | 9/2001 | Uematsu et al. |
| 6,363,928 B1 | 4/2002 | Anderson, Jr. |
| 6,485,152 B2 | 11/2002 | Wood |
| 6,508,850 B1 | 1/2003 | Kotliar |
| 7,028,685 B1 | 4/2006 | Krecke |
| 7,055,519 B2 | 6/2006 | Litwin |
| 7,337,843 B2 | 3/2008 | Mecham et al. |
| 7,748,137 B2 | 7/2010 | Wang |
| 7,858,875 B2 | 12/2010 | Lu |
| 7,975,686 B2 | 7/2011 | Prueitt |
| 7,992,553 B2 | 8/2011 | Le Lievre |
| 8,056,555 B2 | 11/2011 | Prueitt |
| 8,167,041 B2 | 5/2012 | Chiesa et al. |
| 8,333,186 B2 | 12/2012 | Jennings |
| 8,342,169 B2 | 1/2013 | Glynn |
| 8,397,434 B2 | 3/2013 | Bayne |
| 8,430,090 B2 | 4/2013 | Angel et al. |
| 8,604,333 B2 | 12/2013 | Angel et al. |
| 8,701,773 B2 | 4/2014 | O'Donnell et al. |
| 8,739,774 B2 | 6/2014 | O'Donnell et al. |
| 8,748,731 B2 | 6/2014 | MacGregor et al. |
| 8,752,542 B2 | 6/2014 | O'Donnell et al. |
| 8,887,712 B2 | 11/2014 | von Behrens |
| 8,915,244 B2 | 12/2014 | von Behrens |
| 2001/0008144 A1 | 7/2001 | Uematsu et al. |
| 2003/0188477 A1 | 10/2003 | Pasternak et al. |
| 2004/0004303 A1 | 1/2004 | Iskra |
| 2004/0055594 A1 | 3/2004 | Hochberg et al. |
| 2006/0048770 A1 | 3/2006 | Meksvanh et al. |
| 2006/0130652 A1 | 6/2006 | Takewaki et al. |
| 2007/0056726 A1 | 3/2007 | Shurtleff |
| 2008/0066736 A1 | 3/2008 | Zhu |
| 2008/0083405 A1 | 4/2008 | Kimura et al. |
| 2008/0163864 A1 | 7/2008 | Larson |
| 2008/0216822 A1 | 9/2008 | Lazzara et al. |
| 2008/0236227 A1 | 10/2008 | Flynn |
| 2008/0308094 A1 | 12/2008 | Johnston |
| 2009/0056698 A1 | 3/2009 | Johnson et al. |
| 2009/0056699 A1 | 3/2009 | Mills et al. |
| 2009/0056704 A1 | 3/2009 | Donati et al. |
| 2009/0056944 A1 | 3/2009 | Nitschke |
| 2009/0199847 A1 | 8/2009 | Hawley |
| 2009/0260359 A1 | 10/2009 | Palkes |
| 2009/0277224 A1 | 11/2009 | Angel et al. |
| 2009/0277440 A1 | 11/2009 | Angel et al. |
| 2009/0294092 A1 | 12/2009 | Bahl et al. |
| 2009/0320830 A1 | 12/2009 | Bennett |
| 2010/0005966 A1 | 1/2010 | Wibberley |
| 2010/0051016 A1 | 3/2010 | Ammar |
| 2010/0051021 A1 | 3/2010 | Kunz |
| 2010/0175687 A1 | 7/2010 | Zillmer et al. |
| 2010/0300431 A1 | 12/2010 | Carrascosa Perez et al. |
| 2011/0017274 A1 | 1/2011 | Huang et al. |
| 2011/0088686 A1 | 4/2011 | Hochberg et al. |
| 2011/0126824 A1 | 6/2011 | Conlon et al. |
| 2011/0174935 A1 | 7/2011 | Bingham et al. |
| 2011/0203574 A1 | 8/2011 | Harding |
| 2011/0203577 A1 | 8/2011 | Coduri |

(56) References Cited

U.S. PATENT DOCUMENTS

| | | | |
|---|---|---|---|
| 2011/0240006 A1 | 10/2011 | Linke et al. | |
| 2011/0277470 A1 | 11/2011 | Benyaminy et al. | |
| 2011/0277981 A1 | 11/2011 | Muthuramalingam et al. | |
| 2011/0291405 A1 | 12/2011 | Burger et al. | |
| 2012/0067337 A1 | 3/2012 | Hall et al. | |
| 2012/0125400 A1 | 5/2012 | Angel et al. | |
| 2012/0125611 A1 | 5/2012 | Ayirala et al. | |
| 2012/0138293 A1 | 6/2012 | Kaminsky et al. | |
| 2012/0138316 A1 | 6/2012 | Matzakos | |
| 2012/0152307 A1 | 6/2012 | MacGregor et al. | |
| 2012/0167873 A1 | 7/2012 | Venetos et al. | |
| 2012/0192564 A1* | 8/2012 | Mishima | B01D 53/1425 60/676 |
| 2012/0234311 A1 | 9/2012 | Johnson et al. | |
| 2012/0255309 A1 | 10/2012 | Venetos et al. | |
| 2012/0294788 A1 | 11/2012 | Walsh, Jr. et al. | |
| 2013/0081413 A1 | 4/2013 | Abyhammar et al. | |
| 2013/0092153 A1 | 4/2013 | O'Donnell et al. | |
| 2013/0112394 A1 | 5/2013 | O'Donnell et al. | |
| 2013/0206134 A1 | 8/2013 | O'Donnell et al. | |
| 2013/0220305 A1 | 8/2013 | von Behrens | |
| 2013/0319244 A1 | 12/2013 | Ball et al. | |
| 2014/0020559 A1 | 1/2014 | Meirav et al. | |
| 2014/0069416 A1 | 3/2014 | von Behrens | |
| 2014/0190469 A1 | 7/2014 | O'Donnell et al. | |
| 2014/0216717 A1 | 8/2014 | O'Donnell et al. | |
| 2014/0224295 A1 | 8/2014 | Yazawa et al. | |
| 2014/0326234 A1 | 11/2014 | O'Donnell et al. | |
| 2014/0345599 A1 | 11/2014 | O'Donnell et al. | |
| 2014/0347757 A1 | 11/2014 | MacGregor et al. | |
| 2015/0144125 A1 | 5/2015 | von Behrens | |

FOREIGN PATENT DOCUMENTS

| | | |
|---|---|---|
| CN | 200958464 Y | 10/2007 |
| CN | 201059795 Y | 5/2008 |
| CN | 101270675 A | 9/2008 |
| CN | 101280966 A | 10/2008 |
| CN | 101354191 A | 1/2009 |
| CN | 101363958 A | 2/2009 |
| CN | 201359397 Y | 12/2009 |
| DE | 102004013590 A1 | 10/2005 |
| DE | 202005021000 U1 | 1/2007 |
| EP | 0506568 A1 | 9/1992 |
| EP | 0946432 B1 | 1/2001 |
| EP | 988493 B1 | 8/2003 |
| EP | 2335813 | 6/2011 |
| FR | 2696753 A1 | 4/1994 |
| JP | 56085508 | 7/1981 |
| JP | 2001082104 | 3/2001 |
| KR | 20080024309 A | 3/2008 |
| WO | WO-2007146183 A2 | 12/2007 |
| WO | WO-2008153922 A1 | 12/2008 |
| WO | WO-2009002772 A2 | 12/2008 |
| WO | WO-2009126875 A2 | 10/2009 |
| WO | WO-2010032095 A2 | 3/2010 |
| WO | WO-2010040957 A2 | 4/2010 |
| WO | WO-2010043744 A2 | 4/2010 |
| WO | WO-2010088632 A2 | 8/2010 |
| WO | WO-2011053863 A2 | 5/2011 |
| WO | WO-2012006255 A2 | 1/2012 |
| WO | WO-2012006257 A2 | 1/2012 |
| WO | WO-2012006258 A2 | 1/2012 |
| WO | WO-2012128877 A2 | 9/2012 |
| WO | WO-2014127410 | 8/2014 |

OTHER PUBLICATIONS

Adventures in Energy, "Extracting Oil and Natural Gas." 1 pages, accessed Oct. 7, 2013.

Adventures in Energy, "Separating Oil, Natural Gas and Water." 1 page, accessed Oct. 7, 2013.

Bierman et al "Performance of Enclosed Trough OTSG for Enhanced Oil Recovery," SolarPaces 2013, pp. 11.

Bierman et al "Solar Enhanced Oil Recovery Plant in South Oman," SolarPaces 2013; pp. 10.

BrightSource Limitless, "Coalinga Project Facts, A BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.

BrightSource Limitless, "Enhanced Oil Recovery Project—Coalinga," accessed Sep. 19, 2013, http://www.brightsourceenergy.com/coalinga, 2 pages.

Champion Technologies, "Enhanced Oil Recovery." 2 pages, accessed Oct. 7, 2013.

Proz, 'On the edge of manufacturing tolerance' [bulletin board], Mar. 12, 2005 [retrieved on Jan. 7, 2014]. Retrieved from the internet <http://www.proz.com/kudoz/English/military_defense/968330-on_the_edge_of_manufacturing_tolerance.html>.

The Linde Group, "Enhanced Oil Recovery (EOR)", 1 page, accessed Oct. 7, 2013.

Wilson, Bob. "Re: Why does a bridge have rollers under it? How do the rollers of a bridge work?", Newton Ask a Scientist! (DOE Office of Science) [online], Jan. 2, 2008 [retrieved from the internet <URL:http://web.archive.org/web/20080102111713/http://www.newton.dep.anl.gov/askasci/eng99/eng99556.htm>.

Extended European Search Report and Written Opinion for European Patent Application No. 15853473.5, dated Mar. 27, 2018, 13 pages.

\* cited by examiner

GAS PURIFICATION USING SOLAR ENERGY, AND ASSOCIATED SYSTEMS AND METHODS

CROSS-REFERENCE TO RELATED APPLICATIONS

This non-provisional application claims the benefit of provisional application 62/067,826, filed on Oct. 23, 2014, and entitled "Gas Purification Using Solar Energy, and Associated Systems and Methods," the entirety of which is hereby incorporated by reference.

TECHNICAL FIELD

The present technology is generally directed to techniques for purifying gases, including systems and methods for generating and storing solar energy used in purifying the gases.

BACKGROUND

Solar energy has been collected to facilitate a variety of industrial processes. FIG. 1 is a schematic view of a system 100 for generating solar-heated steam in accordance with the prior art. In the illustrated system 100, a solar concentrator array 11 and a fuel-fired steam generator 13 can receive water from a water tank 17. The solar concentrator array 11 can heat up the incoming flow of water and, if sufficient insolation is available, can produce a steam flow 12 having a required flow rate and temperature. If the insolation at the solar concentrator array is not sufficient to produce the required flow rate or temperature of the output steam, the fuel-fired steam generator 13 produces a steam flow 14 that, when mixed with the steam flow 12, produces a combined steam flow 15 having the desired parameters. The flow rates and/or temperatures of the steam flows 12, 14, 15 can be controlled with a pump 18 and valves 16.

While the system shown in FIG. 1 may be suitable for some industrial processes, it may not be adequate to address particular processes, including gas purification processes, which have additional, application-specific variables.

DETAILED DESCRIPTION

Figure 1:
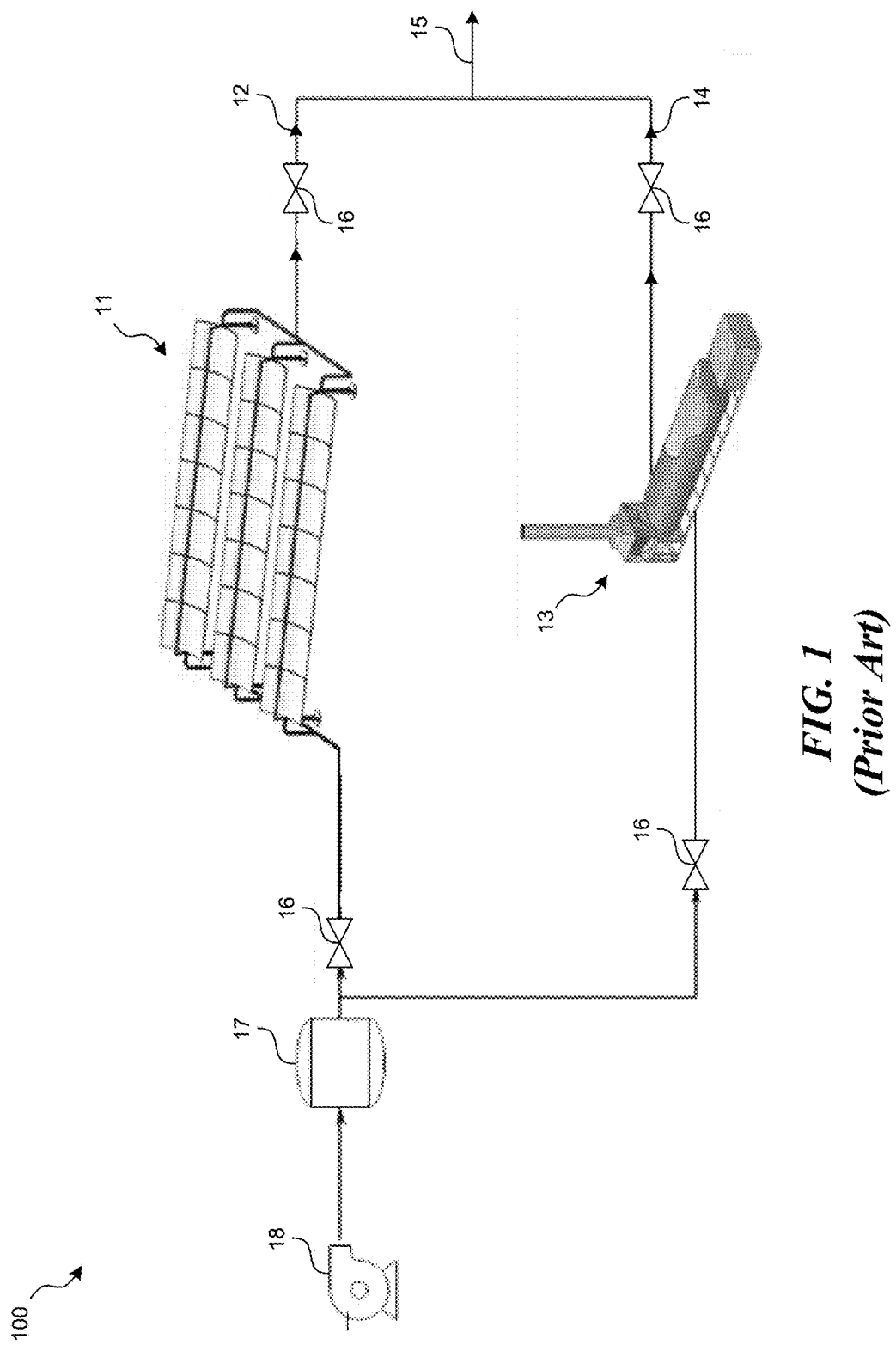
FIG. 1 is a schematic view of a system for generating steam in accordance with the prior art.

Specific details of several embodiments of representative gas purification systems and methods are described below. The inventive technology can be used in the context of gas processing plants, chemical processing plants, gas refineries, gas fields, and/or other suitable applications. Embodiments of the present technology can be used, for example, to reduce consumption of fossil fuels and to reduce undesired variations in gas purification processes. A person skilled in the relevant art will also understand that the technology disclosed herein may have additional embodiments, and that the technology may be practiced without several of the details of the embodiments described below with reference to FIGS. 2-9.

Generally, a gas purification system includes an absorption vessel at which impurities (e.g., $CO_2$, $H_2S$) that are present in an input gas are absorbed into a solvent. The absorption process generates a purified gas (e.g., a "sweet gas") and a solvent that includes the absorbed impurities (e.g., a "rich" solvent). The rich solvent can be regenerated in a regeneration vessel by releasing the absorbed impurities. The regeneration process produces a solvent without the impurities or with a reduced amount of impurities (e.g., a "lean" solvent), and the released impurities may then be routed out of the regeneration vessel (e.g., in the form of an "acid gas"). The lean solvent can be sent back to the absorption vessel to absorb additional impurities from additional input gases, and the cycle repeats. For typical combinations of solvents/impurities, the release of the impurities from the reach solvent is an endothermic process, therefore requiring external energy for a sustained operation. Furthermore, a steady supply of thermal energy to the regeneration vessel typically produces a more efficient process. This is so because in general, the economics of the chemical process improve with the steadiness of the process.

In several embodiments of the present technology, the external energy for the regeneration process is provided by solar concentrators (e.g., via a production of water steam). The energy production of the solar concentrators depends on insolation, which is intrinsically cyclical (e.g., day/night, sunny/cloudy, winter/summer, etc.) and therefore generally not capable of producing a steady supply of thermal energy (e.g., a steady supply of steam). Therefore, in several embodiments of the present technology, the undesirable variability in thermal energy produced by the solar concentrators can be reduced or eliminated by storing thermal energy in thermal storage units and/or by storing the solvent in solvent storage vessels.

The disclosed methods and systems enable cost effective and robust processes for gas purification. In contrast with conventional gas purification systems, the present technology can account for production rates of the rich solvent at the absorption vessel(s) that would not otherwise synch or match with the thermal energy used at the regeneration vessel(s). For example, the generally unsteady steam flow produced by the solar concentrators can be combined with a steam flow produced by a fuel-fired steam generator to produce a generally constant or at least a more steady steam flow that is a source of thermal energy for the regeneration vessel. Furthermore, when the insolation at the solar concentrators is relatively high, excess thermal energy generated by the solar concentrators (and/or excess thermal energy generated by the fuel-fired steam generator, if any) can be stored in one or more thermal storage units. Conversely, when the insolation is relatively low (e.g., nighttime, cloudy weather, winter, etc.) the stored thermal energy can be routed to the regeneration vessel to facilitate a constant rate or a near-constant rate regeneration of the solvent.

In some embodiments of the present technology, the steadiness, continuity and/or uniformity of the gas purification process (e.g., the temperatures, flow rates, heat transfer rates, mass transfer rates, and/or other process variables) can be maintained and/or improved by temporarily storing rich and/or lean solvent in the storage vessels. For example, as explained above, when the production of steam by the solar concentrator array is relatively low (e.g., when the insolation is low), the processing capacity of the regeneration vessel may be reduced and, therefore, may fall below the processing capacity of the absorption vessel. When such a mismatch exists, in some embodiments of the present technology, the absorption vessel can still maintain a relatively steady production of the purified gas by storing a portion of the rich solvent in one or more rich solvent vessels, thereby reducing the present flow rate of the rich solvent to the regeneration vessel. In addition to or in lieu of this arrangement, if the processing capacity of the regeneration vessel (or vessels) exceeds the rich solvent output of the corresponding absorption vessel (e.g., when the solar insolation is high), the excess flow of the lean solvent from the regeneration vessel can be stored in one or more lean solvent storage vessels. As a result, the flow of the lean solvent into the absorption vessel is better matched with the capacity of the absorption vessel. In some embodiments, a controller controls the flows and/or flow rate of the rich solvent from the rich solvent storage vessel to the regeneration vessel and/or the lean solvent from the lean solvent storage vessel to the absorption vessel therefore maintaining or improving steadiness of the production of the sweet gas despite the variability in the production of thermal energy at the solar concentrator array.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

Figure 2:
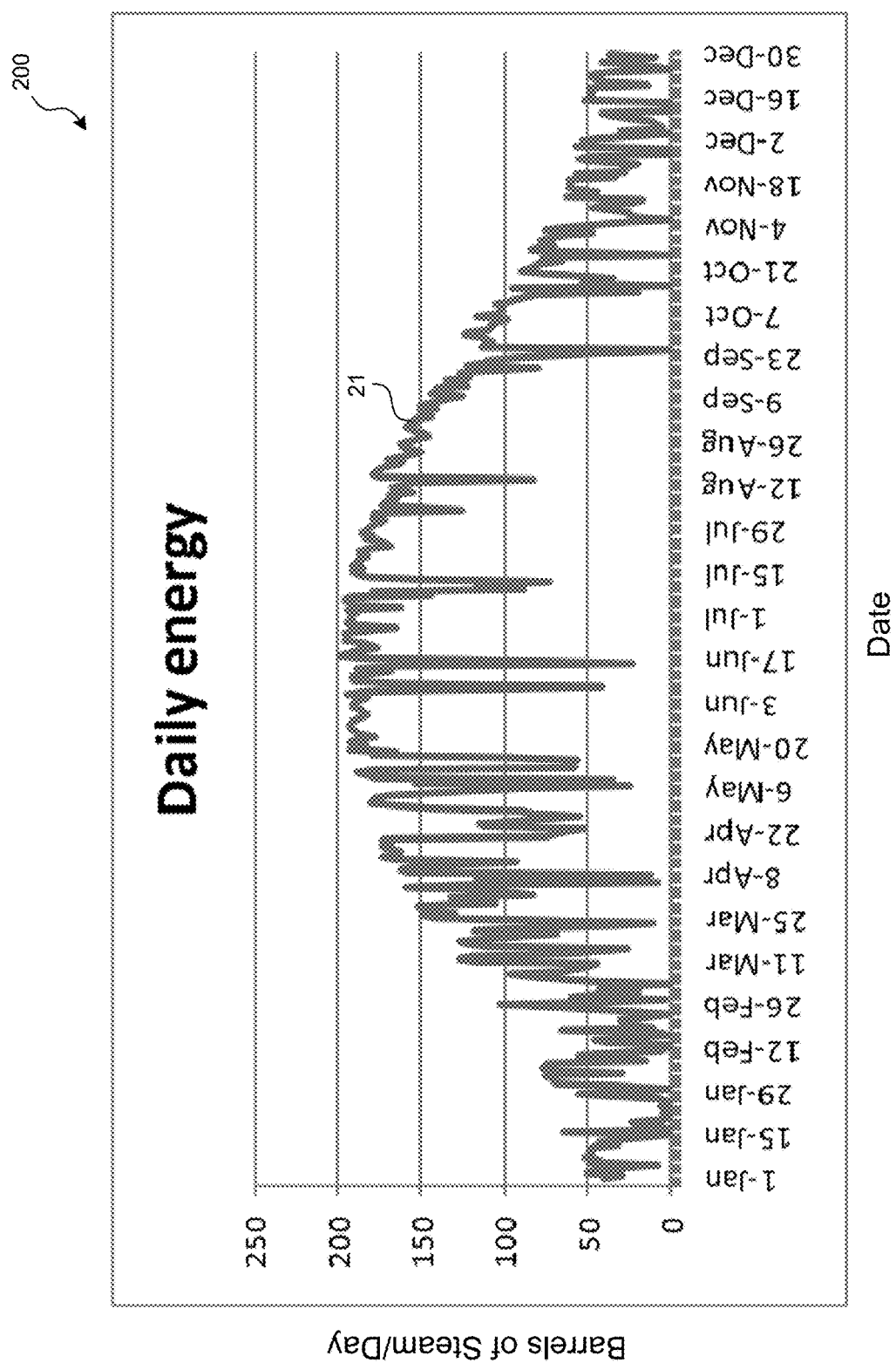
FIG. 2 is a representative graph of a steam flow produced by a solar concentrator array during a year.

FIG. 2 is a representative graph 200 of a steam flow produced by a solar concentrator array over the course of a year. A steam flow line 21 illustrates the amount of steam (barrels/day) as a function of time. For the illustrated solar concentrator array, the periods of low steam flow correspond to the winter months (roughly November-February for the illustrated location). The peak daily steam flow in the winter months is about 50 barrels of steam per day. This peak daily steam flow is punctuated by periods of close to zero steam flow, e.g., from about January 15 to about January 29. The maximum daily steam flow for the illustrated system is about 190 barrels of steam per day during the summer months (roughly end of May to end of July for the illustrated location). However, even during this peak steam flow period, the flow can fall to as low as about 25 barrels of steam per day due to clouds, rain, sandstorms, etc. Therefore, the seasonal and daily variability of the steam flow produced by the solar concentrator array can be relatively high.

Figure 3:
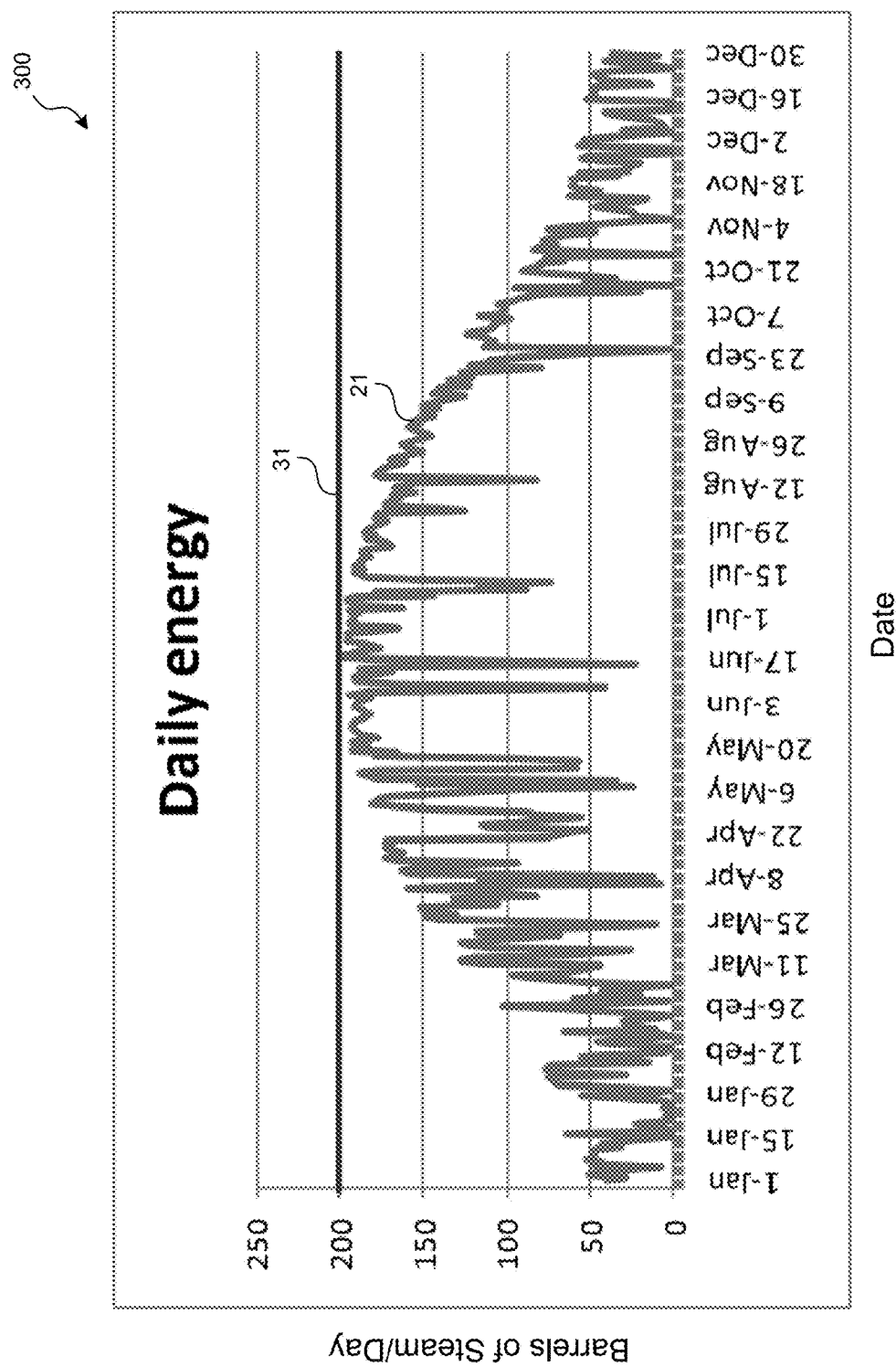
FIG. 3 is a representative graph of the steam flow produced by the combination of a solar concentrator array and another source of steam.

FIG. 3 is a representative graph 300 of the steam flow produced by the combination of the solar concentrator array and another source of steam (e.g., a fuel-fired steam generator or energy stored in a thermal storage unit). The horizontal and vertical axes are the same as in the graph of FIG. 2. In the illustrated embodiment, the steam flow line 21 corresponds to the output from the solar concentrator array alone and a combined steam flow line 31 corresponds to the combined output of the solar concentrator array and the steam from the other source. The combined steam flow line 31 corresponds to a relatively steady 200 barrels per day. In at least some embodiments, the combined steam flow 31 line can represent a generally isothermal steam flow. As explained above, a relatively steady steam flow, including an isothermal steam flow, generally improves the economics of the gas purification process, at least because the efficiency of the process is improved.

Figure 4:
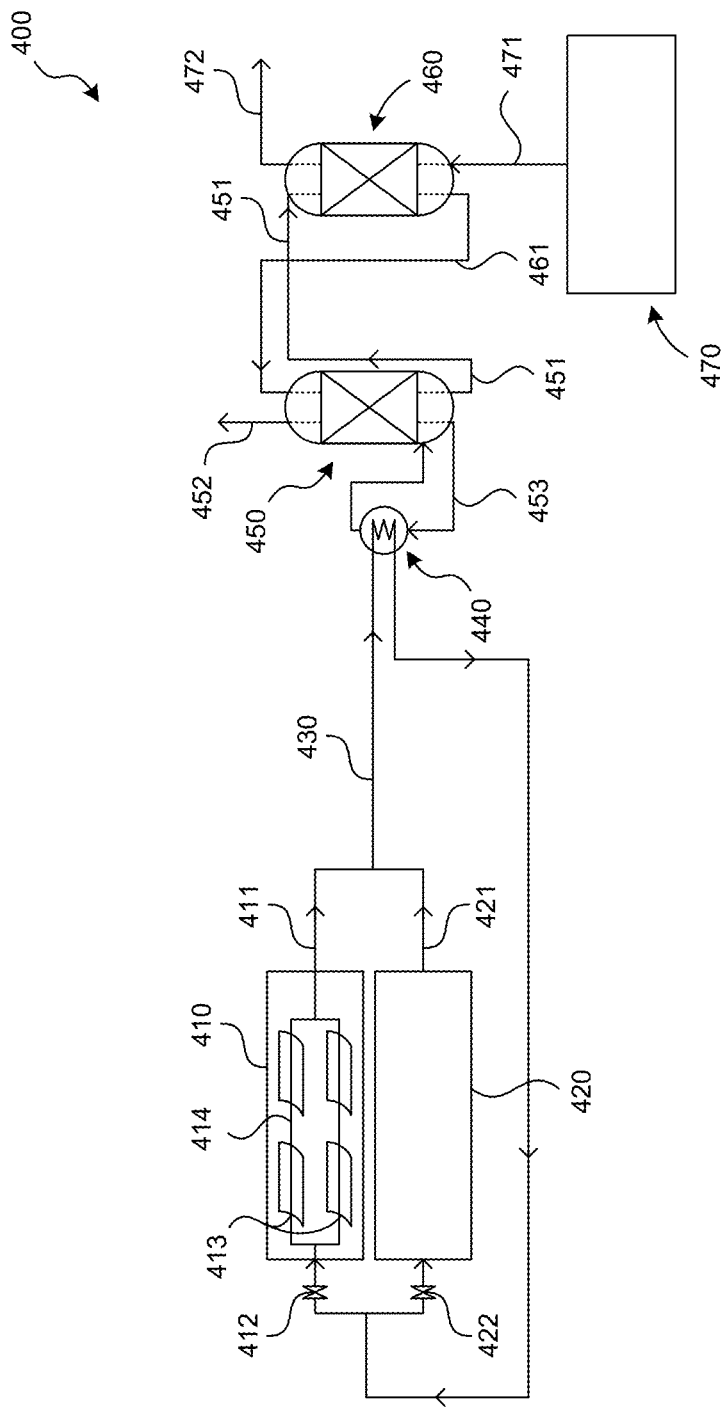
FIG. 4 is a schematic illustration of a gas purification system in accordance with an embodiment of the presently disclosed technology.

FIG. 4 is a schematic illustration of a gas purification system 400 configured in accordance with an embodiment of the presently disclosed technology. An input gas flow 471 (e.g., a flow of methane, ethane, butane, propane, and/or other suitable gases or combinations of gases) may include undesirable impurities (e.g., $CO_2$ and/or $H_2S$) that are to be removed before further processing the gas or shipping the gas to a consumer. A source 470 of the input gas flow 471 can be a gas storage vessel, a gas field and/or another suitable gas repository. The gas purification system 400 can include an absorption vessel 460 connected with pipes, conduits, and/or other flow elements to a regeneration vessel 450. In some embodiments, the absorption vessel 460 and/or the regeneration vessel 450 can be a vertical column that promotes a mass exchange between two or more substances, and in other embodiments, the absorption/regeneration vessels can have other configurations.

After entering the absorption vessel 460, the input gas flow 471 comes in contact with a solvent (e.g., at a solvent zone) selected to absorb the impurities from the input gas flow 471. Representative examples of suitable solvents are diethanolamine (DEA), monoethanolamine (MEA), methyldiethanolamine (MDEA), diisopropanolamine (DIPA) and aminoethoxyethanol (diglycolamine or DGA), and in other embodiments, the solvents can have other compositions. In any of these embodiments, a first or entering solvent flow 451 can enter the absorption vessel 460 to at least partially absorb the impurities from the gas flow 471. The purified or at least partially purified gas may be routed out of the absorption vessel 460 as a purified gas flow 472 (e.g., a "sweet gas" flow), and may, for example, be routed toward another gas processing apparatus, a burner, or a storage and/or transport facility.

As explained above, the first solvent flow 451 absorbs and/or otherwise receives at least some impurities from the input gas flow 471. When the solvent has no absorbed impurities or has relatively small amount of impurities, it is sometimes referred to as a "lean solvent," and when the solvent is saturated with absorbed impurities or includes an appreciable amount of absorbed impurities, it is sometimes referred to as a "rich solvent." After having absorbed an amount of impurities from the input gas flow 471, the solvent can be routed out of the absorption vessel 460 as a second or exiting solvent flow 461 (e.g., a rich solvent flow), and then into the regeneration vessel 450. In some embodiments of the present technology, the solvent in the regeneration vessel 450 (e.g., the rich solvent) is then heated to release some or all of the absorbed impurities (e.g., at a regeneration zone). The released impurities can be routed out of the regeneration vessel 450 as a gas flow 452 (e.g., an "acid gas" flow). After releasing some or all of the absorbed impurities, the solvent can be routed back to the absorption vessel 460 as a first solvent flow 451 (e.g., a lean solvent flow) to absorb additional impurities from the input gas flow 471, and the cycle repeats.

For at least some combinations of solvents/impurities, the release of the gas impurities at the regeneration vessel 450 is improved by an external source of energy because the regeneration process is endothermic (i.e., the process requires heat to progress). In some embodiments of the present technology, the external heat can be provided by combining the outputs of a solar concentrator array 410 and a fuel-fired steam generator 420. The solar concentrator array 410 can include one or more concentrators 413 that concentrate solar radiation onto one or more corresponding receivers 414. The receivers 414 carry water or another suitable working fluid. The focused, concentrated energy produced by the concentrators 413 can be sufficient to cause a phase change of the working fluid from liquid to gas, e.g., water to steam. The steam can exit the solar concentrator array 410 as a first steam flow 411. In some embodiments, the insolation at the solar concentrators 413 may be sufficient to increase the temperature of water flowing inside the receiver 414, but not sufficient to cause the phase change from water to steam. Therefore, a valve 412 can be used to reduce or increase the flow of the working fluid, e.g., to match or at least partially match the flow of incoming water to the insolation available to produce steam. In other embodiments, steam can be separated from heated water at a separator, and the heated water can be returned to the receiver 414 for further heating.

The production of steam by the solar concentrator array may be supplemented/balanced by the fuel-fired steam generator 420. For example, the fuel-fired steam generator 420 can burn fossil fuels to generate a second steam flow 421, and the first steam flow 411 and the second steam flow 421 can be combined to form a combined steam flow 430 that is routed toward the regenerator 450. A valve 422 can at least partially control the second steam flow 421 by controlling an incoming water flow rate to the fuel-fired steam generator 420. As explained with respect to FIG. 3, by combining the output flows of the solar concentrator array 410 and the fuel-fired steam generator 420, the system 400 can produce a combined steam flow 430 that can be generally isothermal and/or at a generally constant flow rate.

As explained above, in at least some embodiments of the present technology, external heat sustains the release of the impurities from the solvent in the regeneration vessel 450 because the release process is endothermic. The required heat can be provided by transferring thermal energy from the combined steam flow 430 to a solvent flow 453 in the regenerator via a regenerator heat exchanger 440. The solvent flow 453 can exit the regeneration vessel 450 and enter the regenerator heat exchanger 440 at a first, lower temperature, and then exit the regenerator heat exchanger 440 and return to the regeneration vessel 450 at a second, higher temperature after receiving heat from the combined steam flow 430 in the regenerator heat exchanger 440. A generally isothermal steam flow 430 at a generally constant flow rate results in a generally steady amount of heat transferred to the solvent flowing through the heat exchanger 440 and further into the regeneration vessel 450, which improves the economics of the gas purification process. After exiting the regenerator heat exchanger 440, the combined steam flow 430 can be routed back to the fuel-fired steam generator 420 and/or the solar concentrator array 410 as water, a combination of water and steam, or steam at a reduced temperature to receive additional energy from the solar collector array 410 and/or fuel-fired steam generator 420, and the cycle continues.

Figure 5:
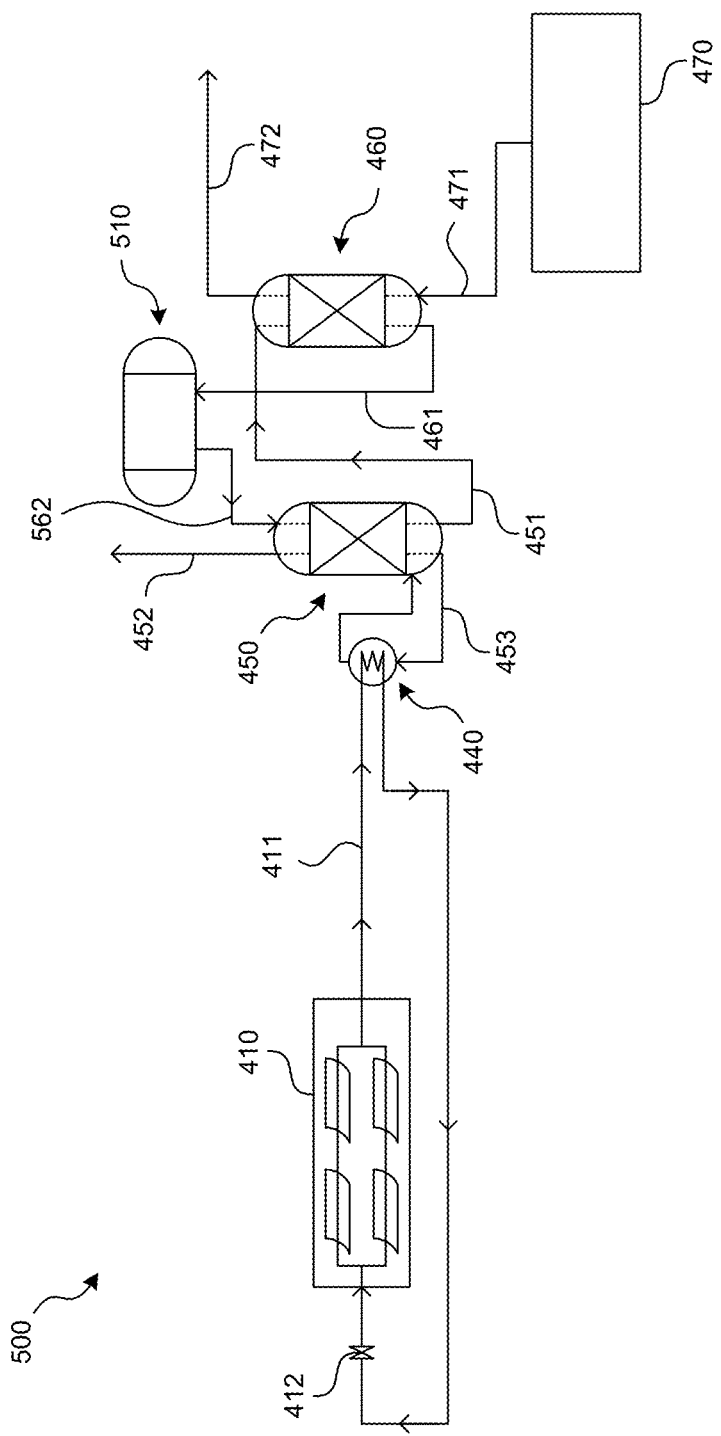
FIG. 5 is a schematic illustration of a gas purification system having a solvent storage vessel in accordance with an embodiment of the presently disclosed technology.

FIG. 5 is a schematic illustration of a gas purification system 500 having a solvent storage vessel 510 configured in accordance with an embodiment of the presently disclosed technology. In a particular aspect of this embodiment, the fuel-fired steam generator 420 described above with reference to FIG. 4 has been eliminated. For the sake of brevity, some elements of the gas purification system 500 that are similar or generally similar to those of the gas purification system 400 shown in FIG. 4 are not explained in detail here. In the gas purification system 500, heat is transferred from the first steam flow 411 to the solvent flow 453 at the regenerator heat exchanger 440 e.g., via a thermal path. This heat received by the solvent flow 453 can promote the release of gas impurities from the solvent at the regeneration vessel 450, e.g., because the impurities are more easily separated from the solvent at higher temperatures. As explained above, due to the variability of the insolation at the solar collector array 410, the flow rate and/or temperature of the first steam flow 411 can also vary. As a result, the amount of heat transferred from the first steam flow 411 to the solvent flow 453 and further to the regeneration vessel 450 generally also varies. Such a variability in the external heat provided to the regeneration vessel 450 can cause a corresponding variability of the processing capacity of the regeneration vessel 450. For example, when less external heat is available via the heat exchanger 440, less acid gas 452 and less regenerated solvent can be produced at the regeneration vessel 450. Conversely, when more external heat is available via the heat exchanger 440, more acid gas 452 and more regenerated solvent can be produced at the regeneration vessel 450. In general, the economics of the process are improved when the flow rate of the rich solvent to the regeneration vessel 450 corresponds with or at least approximately corresponds with the flow rate of the external heat at the heat exchanger 440. Put another way, the process economics improve when the rate at which the energy required to drive the constituents from the solvent at least approximately matches the rate at which energy (e.g., heat) is provided to the regeneration vessel 450.

In some embodiments of the technology, the capacity of the regeneration vessel 450 can be more closely matched with the capacity of the heat exchanger 440 via the rich solvent storage vessel 510. For example, when the heat available for use by the regeneration vessel 450 is relatively low (e.g., when the insolation is low), a portion of the rich solvent flow 461 can be collected in the rich solvent storage vessel 510. Conversely, when the heat available for use by the regeneration vessel 450 is relatively high (e.g., when the insolation is high), a corresponding flow of the collected rich solvent 562 at the rich solvent storage vessel 510 can be released to the regeneration vessel 450. As a result, the availability of the external heat at the heat exchanger 440 more closely matches the consumption of the external heat at the regeneration vessel 450, and the economics of the process generally improve.

Figure 6:
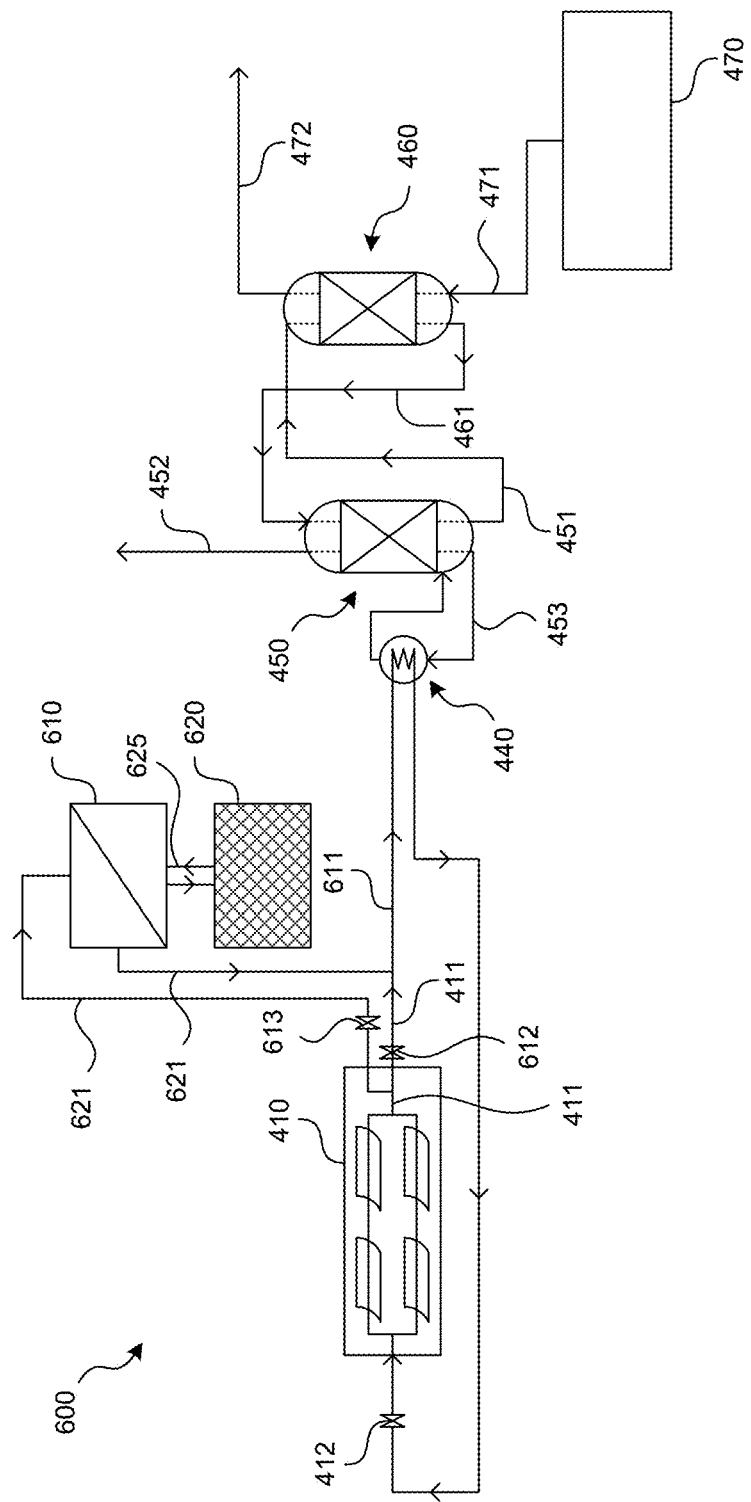
FIG. 6 is a schematic illustration of a gas purification system having a thermal storage unit in accordance with an embodiment of the presently disclosed technology.

FIG. 6 is a schematic illustration of a gas purification system 600 having a thermal storage unit 620 configured in accordance with an embodiment of the presently disclosed technology. As explained with reference to FIG. 5, the first steam flow 411 (or the energy carried by the first steam flow 411) generally varies as a function of the insolation incident on the solar concentrator array 410. In some embodiments of the technology, the thermal storage unit 620 can store thermal energy when the insolation at the solar concentrator array 410 is relatively high, e.g., exceeding the rate at which thermal energy is consumed at the regeneration vessel 450. Conversely, when the insolation is relatively low, the thermal energy stored at the thermal storage unit 620 can be used to supplement the steam production of the solar concentrator array 410, thereby improving the steadiness of a combined steam flow 611 provided to the regenerator 450 via the heat exchanger 440. For example, the flow rate and/or temperature of the steam more constant than without the thermal storage unit 620. The amount of steam provided directly to the heat exchanger 440 and/or the thermal storage unit 620 can be controlled by valves 612, 613.

In some embodiments of the technology, an output steam flow 621 from the solar concentrator array 410 can be routed to a thermal storage heat exchanger 610 to exchange heat with a working fluid flow 625. The working fluid flow 625 can exchange heat with the thermal storage unit 620. After exchanging heat with the working fluid flow 625 at the thermal storage heat exchanger 610 (e.g., transferring heat to the working fluid flow 625 when the insolation is relatively high, and transferring heat from the working fluid flow 625 when the insolation is relatively low), the steam flow 621 can be combined with the first steam flow 411 to form a combined steam flow 611 that is generally more steady than a corresponding steam flow produced with an equivalent solar concentrator array 410, but without the thermal storage unit 620. As explained above, the improved steadiness of the combined steam flow 611 at the regenerator heat exchanger 440 can improve the economics of the gas purification process. In some embodiments, multiple thermal storage units 620 and/or multiple thermal storage heat exchangers 610 can be used. In some embodiments, the steam flow 621 can transfer heat to/from the thermal storage unit 620 without the intervening thermal storage heat exchanger 610 by, for example, routing the steam flow 621 into and out of the thermal storage unit 620.

In some embodiments, the thermal storage unit 620 may be a sensible thermal storage unit, e.g., a thermal storage unit at which the added heat does not cause a phase change in the heat storage elements at the thermal storage unit. For example, the thermal storage unit 620 may include closely spaced concrete elements that form flow passages for the working fluid flow 625 or the steam flow 621. In general, concrete is capable of withstanding a relatively high temperature, e.g., in excess of 300° C., and is therefore able to store a relatively large amount of thermal energy per unit of volume without changing phase. The working fluid flow 625 may be an oil flow that can withstand high temperatures (e.g., in excess of 300° C.). Furthermore, if the concrete plates are relatively thin, the plates warm up/cool down relatively quickly, thus enabling the thermal storage unit to charge/discharge relatively quickly. In other embodiments, the thermal storage unit 620 can include materials that undergo a phase change when heated/cooled, e.g., salts that melt when heat is added to the unit and solidify when heat is withdrawn from the unit. Further details of suitable thermal storage units are described in U.S. Provisional Application 62/067,806, titled "Heat Storage Devices for Solar Steam Generation, and Associated Systems and Methods," incorporated herein by reference. To the extent the foregoing application and/or any other materials incorporated herein by reference conflict with the present disclosure, the present disclosure controls.

Figure 7:
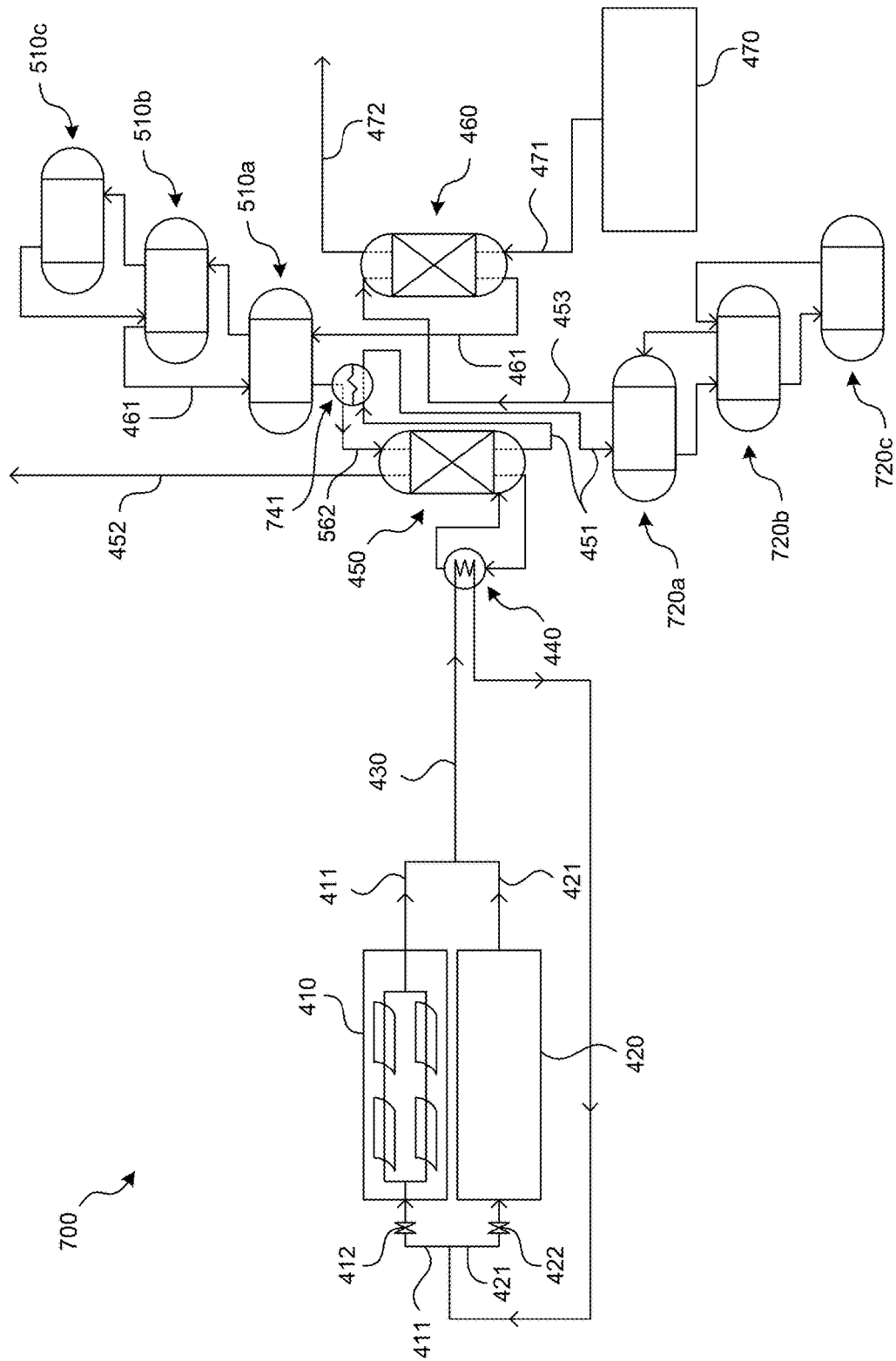
FIG. 7 is a schematic illustration of a gas purification system having rich and lean solvent storage units in accordance with an embodiment of the presently disclosed technology.

FIG. 7 is a schematic illustration of a gas purification system 700 having both rich and lean solvent storage units in accordance with an embodiment of the presently disclosed technology. In the gas purification system 700, the first steam flow 411 produced by the solar concentrator array 410 and the second steam flow 421 produced by the fuel-fired steam generator 420 combine to form the combined steam flow 430 having a reduced flow rate and/or temperature variability. Depending on the cost of the fuel for the fuel-fired steam generator 420, in some embodiments it may be economically advantageous to tolerate some variability in the combined steam flow 430 if, for example, the resulting variability in the production of the sweet gas 472 can be reduced or eliminated. The combination of rich and lean solvent storage units can provide this function.

In a particular example, when the combined steam flow 430 has a relatively high flow rate and/or temperature (e.g., the steam flow 430 has a relatively high thermal energy), the regeneration of the solvent in the regeneration vessel 450 is relatively fast, resulting in a relatively large acid gas flow 452 and a relatively large lean solvent flow 451. The opposite is true if the combined steam flow 430 has a relatively low flow rate and/or temperature. Accordingly, when the combined steam flow 430 has a relatively high flow rate and/or temperature, a portion of the lean solvent flow 451 exiting the regeneration vessel 450 can be stored in one or more lean solvent storage vessels 720*a-c*, while the remaining lean solvent flow 451 is routed to the absorption vessel 460. For example, all the lean solvent exiting the regeneration vessel 450 can enter the lean solvent storage vessels 720*a-c*, with at least some remaining or accumulating, and some directed to the absorption vessel 460. Accordingly, the stored lean solvent can be used to augment the lean solvent flow 453 and therefore increase the availability of the lean solvent at the absorption vessel 460 when, for example the energy of the combined steam flow 430 is relatively low. In addition to or in lieu of this arrangement, one or more rich solvent storage vessels 510*a-c* can be used to store a part of the rich solvent flow 461 when the energy of the combined steam flow 430 is relatively low (e.g., the combined steam flow 430 has a relatively low flow rate and/or temperature). Conversely, additional rich solvent can be added to a rich solvent flow 562 from the rich solvent storage vessels 510*a-c* when the energy of the combined steam flow 430 is relatively high. The process of storing/releasing the rich and/or lean solvent promotes a more steady sweet gas flow 472, in turn improving the economics of the process in spite of the combined steam flow 430 not necessarily being constant.

The gas purification system 700 can include a process heat exchanger 741 that improves the efficiency of the overall process. In general, the absorption process at the absorption vessel 460 takes place at a lower temperature than the corresponding regeneration process in the regeneration vessel 450. Therefore, the rich solvent flow 461 exiting the absorption vessel 460 is generally at a lower temperature than that of the lean solvent flow 451 exiting the regeneration vessel 450. Furthermore, as explained above, the regeneration process at the regeneration vessel 450 is endothermic, requiring external thermal external energy to proceed. Accordingly, in some embodiments of the present technology, heat from the lean solvent flow 451 exiting the regeneration vessel 450 can be transferred to the rich solvent flow 461 entering the regeneration vessel 450 at the process heat exchanger 741 to decrease the overall amount of the thermal energy needed at the regenerator heat exchanger 440. The heat transfer at the heat exchanger 741 can further improve the economics of the process.

Figure 8:
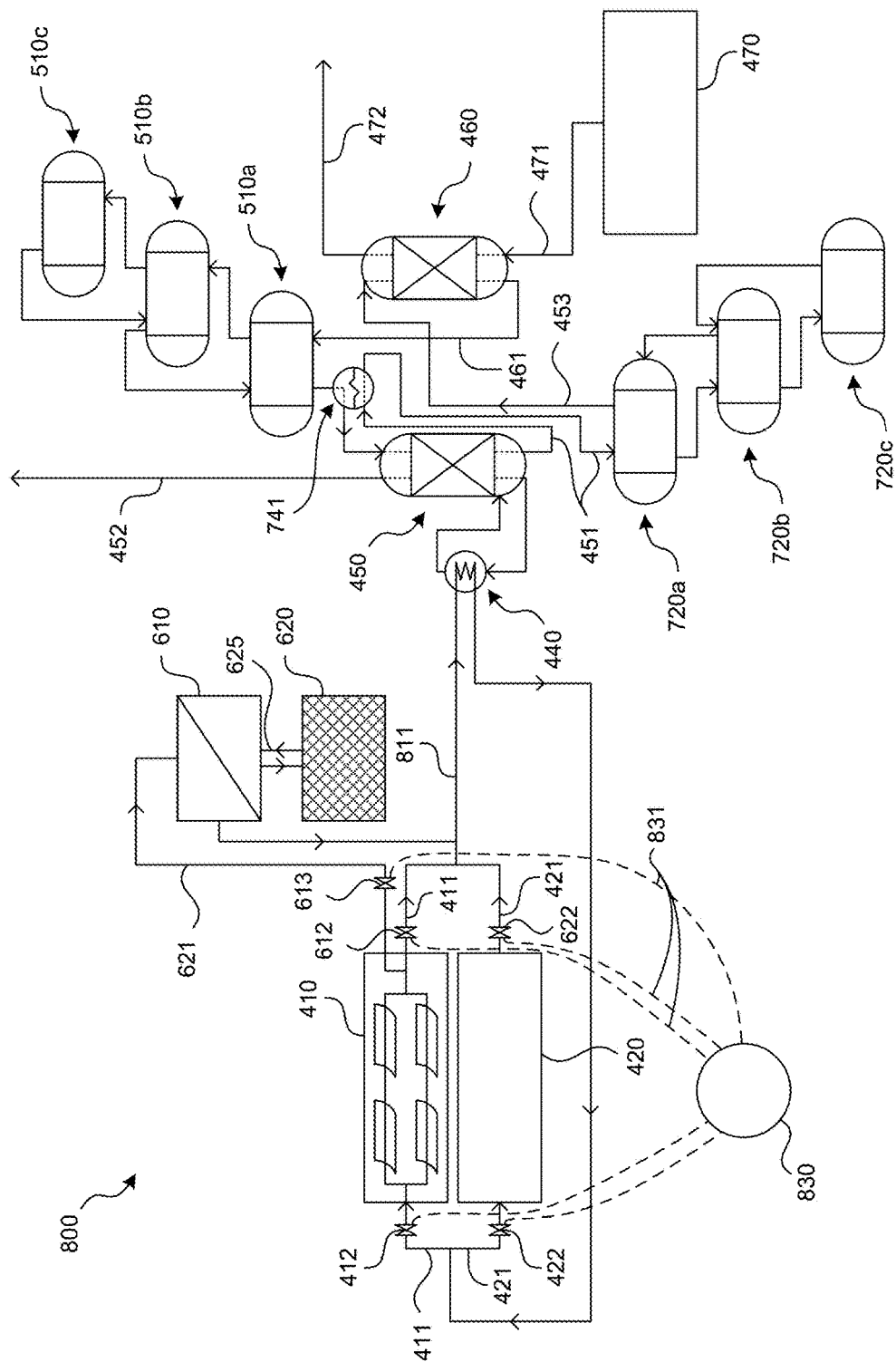
FIG. 8 is a schematic illustration of a gas purification system in accordance with an embodiment of the presently disclosed technology.

FIG. 8 is a schematic illustration of a gas purification system 800 having a controller 830 configured in accordance with another embodiment of the presently disclosed technology. The system 800 includes the thermal storage unit 620 and the rich/lean storage vessels 510a-c/720a-c described above. In operation, the flow rate and/or temperature of a combined steam flow 811 can be made steadier by storing/withdrawing thermal energy from the thermal storage unit 620. Also, the purified gas flow 472 can be further steadied by storing/releasing the rich/lean solvent in one or more storage vessels 510a-c/720a-c. The controller 830 is operationally linked to the system components (e.g., to one or more valves 412, 422, 612, 622, and 613) to control the flow rates of the steam flows. The controller 830 may have additional links 831 (not shown for purposes of clarity) to control the flow of the lean/rich solvent in and out of the lean/rich storage vessels. The controller 830 may include non-volatile instructions which, when executed, cause the valves and/or pumps (not shown) to adjust the flow rates of the flows in the process.

Figure 9:
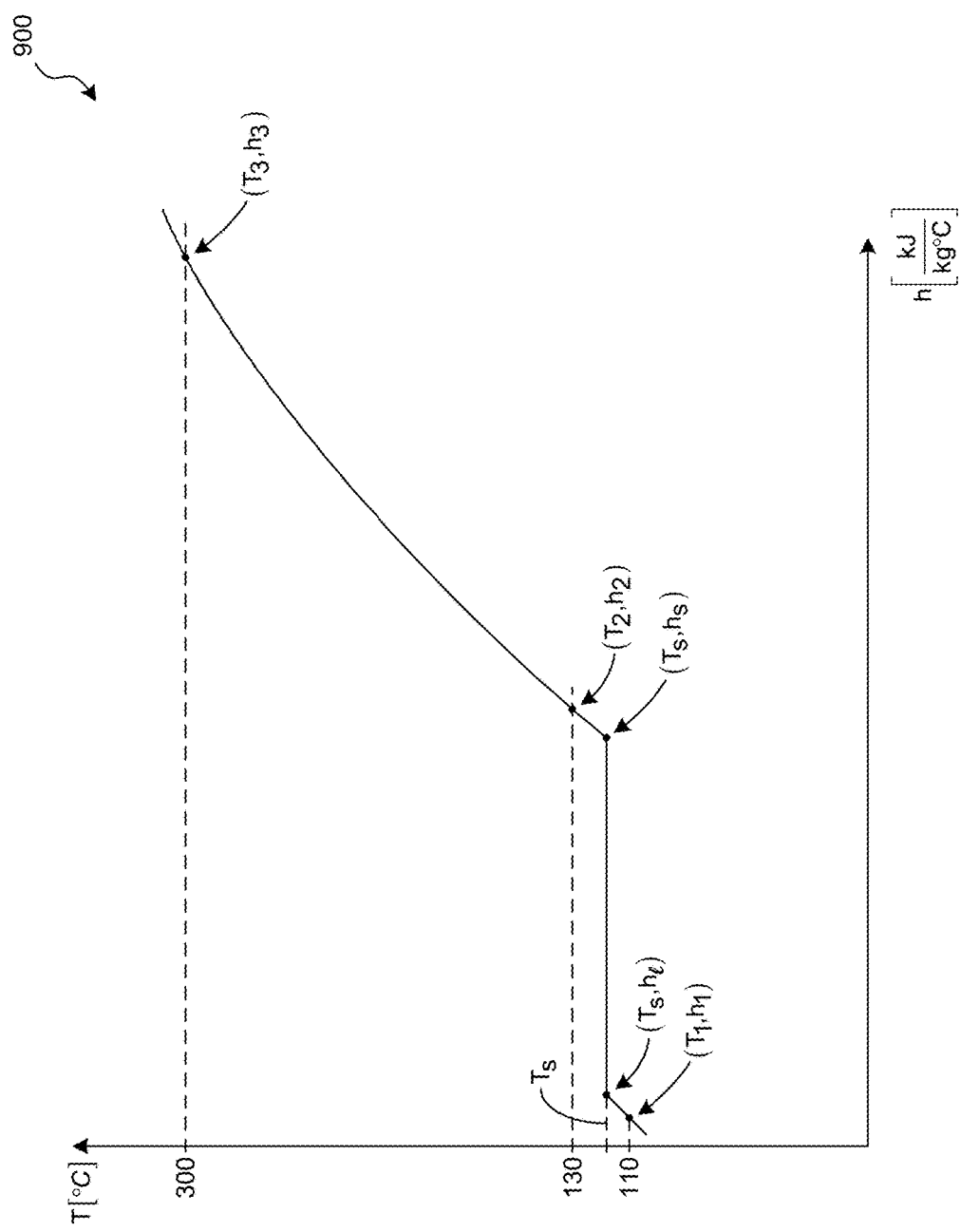
FIG. 9 is a temperature/enthalpy graph of a water/steam process in which energy is exchanged with a thermal storage unit in accordance with an embodiment of the presently disclosed technology.

FIG. 9 illustrates a temperature/enthalpy graph 900 of a water/steam process in which energy is exchanged with a thermal storage unit in accordance with an embodiment of the presently disclosed technology. The graph 900 shows the enthalpy of the water/steam on the horizontal axis and the temperature of the water/steam on the vertical axis. In the illustrated embodiment, water can enter, for example, a solar concentrator array or a fuel-fired steam generator at an enthalpy $h_1$ and temperature $T_1$ of about 110° C. (and at a pressure that is sufficiently above atmospheric pressure to keep the boiling temperature of the water above 110° C.). The water is initially heated to its saturation temperature $T_s$ so as to have an increased enthalpy $h_l$. The water then undergoes a phase change to produce steam at a temperature $T_s$ and enthalpy $h_s$ followed by additional heating to a temperature $T_3$ of about 300° C. and an enthalpy $h_3$. The steam that leaves the solar concentrator array and/or fuel-fired steam generator at about 300° C. (or higher) can transfer energy to the thermal storage unit, either via the thermal storage heat exchanger unit or by direct contact with the thermal storage unit. For the illustrated parameters of water/steam, the resulting temperature in the thermal storage unit (e.g., the temperature of the concrete blocks or plates inside the thermal storage unit) can rise up to 300° C. Therefore, the temperature of the thermal storage unit can be more than twice the saturation temperature of the water flowing through solar concentrator array and/or fuel-fired steam generator. This is in contrast with the conventional power generating plants where the heat exchangers are configured to operate in a range of temperatures that is close to the saturation temperature of the steam, e.g., from about 110° C. ($T_1$, $h_1$) to about 130° C. ($T_2$, $h_2$).

From the foregoing, it will be appreciated that specific embodiments of the present technology have been described herein for purposes of illustration, but that various modifications may be made without deviating from the present technology. Moreover, while various advantages and features associated with certain embodiments have been described above in the context of those embodiments, other embodiments may also exhibit such advantages and/or features, and not all embodiments need necessarily exhibit such advantages and/or features to fall within the scope of the present technology. Accordingly, the disclosure can encompass other embodiments not expressly shown or described herein. The following claims provide further embodiments of the present technology.

We claim:

1. A chemical processing system, comprising:
   an absorption vessel;
   a solvent storage vessel having a solvent inlet coupled to a solvent outlet of the absorption vessel;
   a regeneration vessel having a solvent inlet coupled to a solvent outlet of the solvent storage vessel;
   at least one solar concentrator having a high energy outlet for a first steam flow;
   a fuel-fired steam generator having a high energy outlet for a second steam flow; and
   a controller having instructions that, when executed, control a gas purification process comprising—
      directing a gas to the absorption vessel;
      at the absorption vessel, absorbing impurities from the gas into a solvent;
      releasing the gas from the absorption vessel;
      releasing the solvent from the absorption vessel to the solvent storage vessel;
      directing the solvent from the solvent storage vessel to the regeneration vessel;
      generating a combined steam flow by combining the first steam flow and the second steam flow, wherein the combined steam flow is generally isothermal irrespective of an insolation at the at least one solar concentrator;
      transferring heat from the combined steam flow to the regeneration vessel; and
      regenerating the solvent in the regeneration vessel by releasing the impurities from the solvent.

2. The system of claim 1, further comprising:
   a process heat exchanger having:
      a first flow path coupling the solvent outlet of the solvent storage vessel to the solvent inlet of the regeneration vessel, and
      a second flow path coupling a solvent outlet of the regeneration vessel to a solvent inlet of the absorption vessel, the second flow path being in thermal communication with the first flow path.

3. The system of claim 2, further comprising:
   a regenerator heat exchanger for transferring heat from the combined steam flow to the regeneration vessel, wherein the regenerator heat exchanger is separate from the regeneration vessel.

4. The system of claim 3 wherein the heat is first heat, the system further comprising:
a thermal storage unit having a working fluid; and
a thermal storage heat exchanger coupled between the thermal storage unit and the at least one solar concentrator to transfer second heat between steam generated by the at least one solar concentrator and the working fluid of the thermal storage unit.

5. The system of claim 4 wherein the thermal storage unit includes a sensible thermal storage unit that includes a plurality of concrete plates for storing thermal energy.

6. The system of claim 1 wherein the solvent storage vessel includes a first solvent storage vessel, the system further comprising at least one additional storage vessel coupled to the first solvent storage vessel.

7. The system of claim 1 wherein the solvent storage vessel includes a rich solvent storage vessel, the system further comprising at least one lean storage vessel coupled to the regeneration vessel.

8. The system of claim 7 wherein the at least one lean storage vessel is a first lean solvent storage vessel, the system further comprising a second lean solvent storage vessel coupled to the first lean solvent storage vessel.

9. A chemical processing system, comprising:
a controller having instructions that, when executed, control a gas purification process comprising:
directing a gas to an absorption vessel;
at the absorption vessel, absorbing impurities from the gas into a solvent;
releasing the gas from the absorption vessel;
releasing the solvent from the absorption vessel to a solvent storage vessel;
directing the solvent from the solvent storage vessel to a regeneration vessel;
generating a combined steam flow by combining a first steam flow from at least one solar concentrator and a second steam flow from a fuel-fired steam generator, wherein the combined steam flow is generally isothermal irrespective of an insolation at the at least one solar concentrator;
transferring heat from the combined steam flow to the regeneration vessel; and
regenerating the solvent in the regeneration vessel by releasing the impurities from the solvent.

10. The system of claim 9, further comprising:
directing at least a portion of the first steam flow to a thermal storage heat exchanger, wherein the portion of the first steam flow is a third steam flow; and
directing a working fluid of the thermal storage unit to the thermal storage heat exchanger to transfer heat between the first steam flow and the working fluid of the thermal storage unit.

11. The system of claim 10 wherein the thermal storage unit includes a sensible thermal storage unit that includes a plurality of concrete plates for storing thermal energy.

12. The system of claim 10 wherein the thermal storage unit includes a sensible thermal storage unit comprising solid elements for storing energy, and wherein an average temperature of the solid elements, expressed in ° C., exceeds twice a saturation temperature of the first steam flow, expressed in ° C.

13. The system of claim 10 wherein a temperature of the third steam flow before being added to the combined steam flow, expressed in ° C., is within +/−15% of a saturation temperature of the third steam flow, expressed in ° C.

14. The system of claim 9 wherein the solvent storage vessel is a first solvent storage vessel, the system further comprising a second solvent storage vessel having:
a solvent inlet coupled to a solvent outlet of the first solvent storage vessel, and
a solvent outlet coupled to a solvent inlet of the first storage vessel.

15. The system of claim 14, further comprising a third solvent storage vessel having:
a solvent inlet coupled to a solvent outlet of the regeneration vessel, and
a solvent outlet coupled to a solvent inlet of the absorption vessel.

* * * * *